G. S. Reynolds,
Horse Rake.
No. 4128 Reissued, Sept. 20. 1870.
Fig. 1.
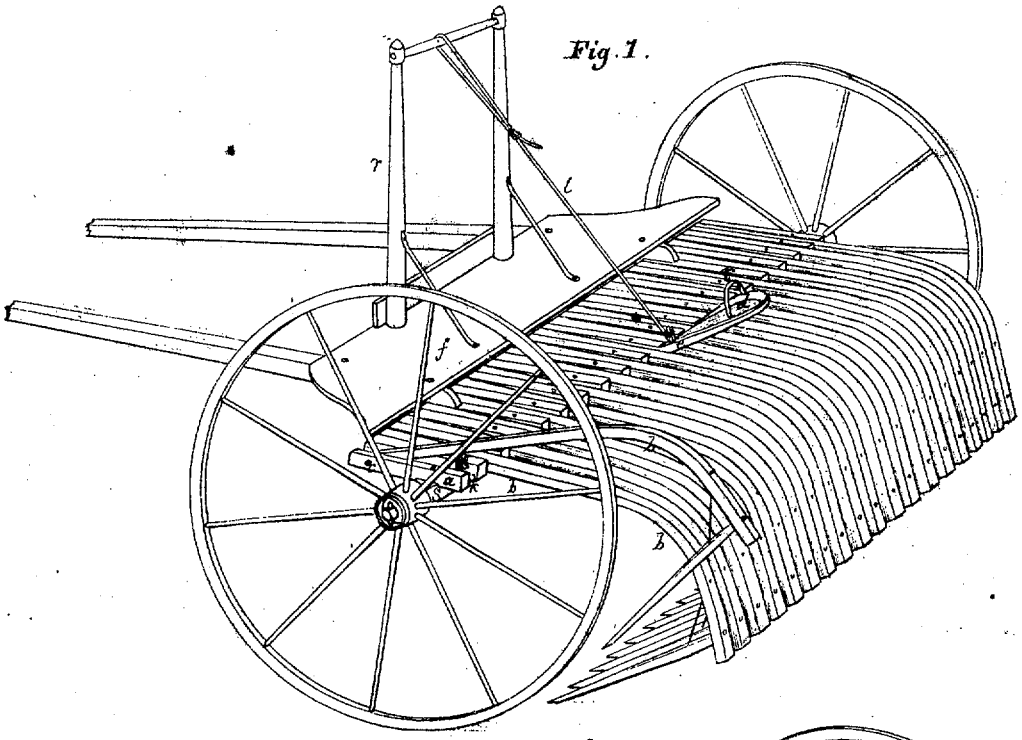
Fig. 2
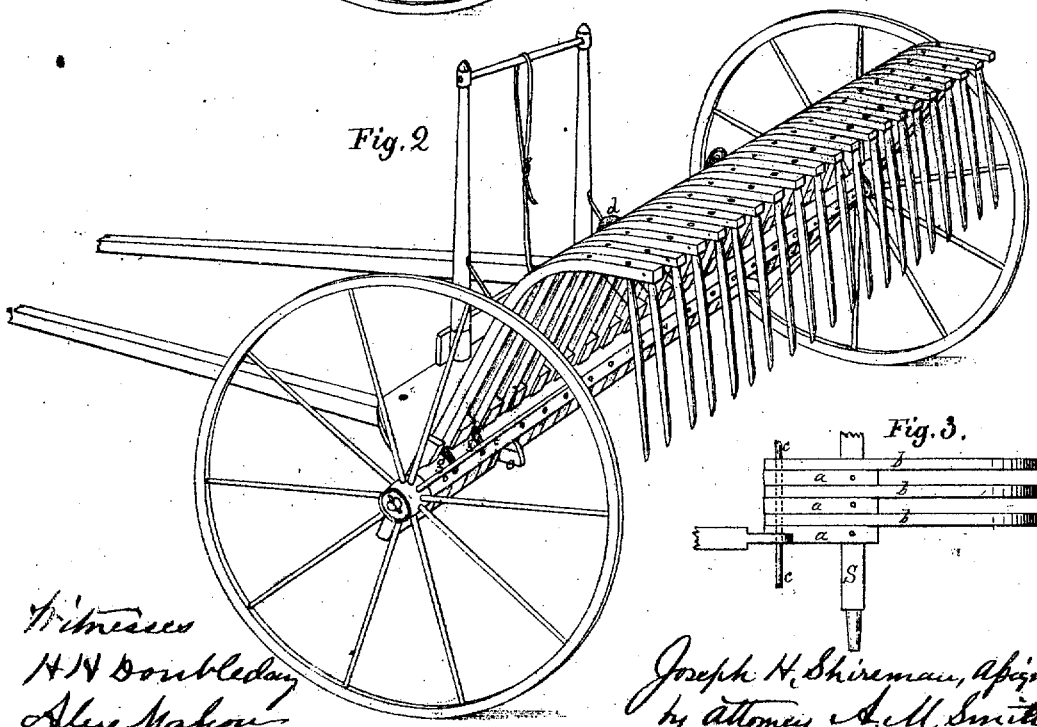
Fig. 3.
Witnesses
H H Doubleday
Alex Mahon
Joseph H. Shireman, Assignee
by attorney A. M. Smith

United States Patent Office.

JOSEPH H. SHIREMAN, OF YORK, PENNSYLVANIA, ASSIGNEE OF GEORGE S. REYNOLDS.

*Letters Patent No.* 23,943, *dated May* 10, 1859; *reissue No.* 4,128, *dated September* 20, 1870.

IMPROVEMENT IN HORSE HAY-RAKES.

The Schedule referred to in these Letters Patent and making part of the same.

*To all whom it may concern:*

Be it known that GEORGE S. REYNOLDS, of East Bethel, in the county of Windsor and State of Vermont, did invent certain new and useful Improvements in Horse Hay-Rakes, of which the following is a full, clear, and exact description, reference being had to the accompanying drawing making part of this specification, in which—

Figure 1 is a perspective view;

Figure 2 represents the rake with the teeth elevated as in discharging the hay; and Figure 3 is a detached view, showing the manner of attaching the shafts to the axle.

In the drawing—

S is the axle.

*a* are blocks, attached to the axle, at short distances from each other, leaving spaces, *k*, between them, for the teeth *b* to play in. These teeth are hung above the axle, resting in the spaces *k*, and are hinged at their forward ends to blocks *a*, at a point in front of said axle, by means of rod *c*.

The shafts are connected with the axle either by means of rod *c*, two of blocks *a* being cut away or halved, the ends of the shafts being made to take the place of the portions thus removed from the blocks, or, if preferred, additional blocks may be halved onto blocks *a*, and the shafts may be attached to these. The method of attaching is plainly shown in fig. 3.

The teeth are held to the ground by means of springs *g*, one end of each spring being attached to a tooth, while the other end is secured to the axle.

One of the blocks *a* is prolonged or extended toward the rear of the rake, as at *e*, figs. 1 and 2, and is provided with a step or shoe, *d*, having a strap, *t*, across it, for the purpose of assisting in controlling the rising and falling movements of the teeth, by means of the foot of the driver, whereby said shoe is made to serve as a foot-lever.

*f* is a board or platform, placed upon the shafts, and not only serves as a support for one foot of the driver, but also limits the throw of the teeth.

A frame, *r*, is attached to the board *f*, the top of which supports the hand, and a strap, *t*, which is attached to the middle block *e*, near the shoe, for the purpose of steadying the rake.

It is apparent that, from the fact that the rod *c*, to which both the teeth and the shafts are hinged, is above the center of the axle, the draft of the horse may be applied to lift the teeth from the ground, and it will also be seen that, when the teeth are in the elevated position represented in fig. 2, the power applied by the horse may be used in returning the rake to a proper position for raking.

It will also be readily seen that the weight of the blocks *a*, rod *c*, and the forward ends of the teeth, serve to partly counterbalance the rear or raking ends of the teeth.

In operating the rake, the driver can elevate the teeth by simply throwing his weight upon the platform, at the same time removing the pressure from the shoe *d*, and can allow the teeth to fall to the ground after they have been elevated; by reversing this operation, the blocks to which the shafts are connected, and shoe *d*, serve as levers to effect these movements of the teeth in a manner that will be readily understood.

What is claimed as the invention of GEORGE S. REYNOLDS, is—

1. In combination with the shafts, hinged to the axle, substantially as described, the independently-acting rake-teeth, arranged over and having their hinged ends extending in front of the axle, as set forth.

2. The arrangement of the spaces *k*, arch arms *b*, elastic spring *g*, shoe *d*, strap *t*, frame *r*, and strap *l*.

Witnesses: JOSEPH H. SHIREMAN.

JOHN A. WILSON,

CHARLES MCNAIR.